United States Patent [19]

Reichle et al.

[11] Patent Number: 5,216,122

[45] Date of Patent: Jun. 1, 1993

[54] REMOVAL OF RESIDUAL ETHYLENE OXIDE FROM POLY(ETHYLENE OXIDE)

[75] Inventors: Walter T. Reichle, Warren, N.J.; Geoffrey A. D'Netto, Easton, Pa.; Guy M. Troy, Old Bridge, N.J.; Meyer R. Rosen, East Brunswick, N.J.; Elke M. A. Clark, Ringoes, N.J.

[73] Assignee: Union Carbide Chemicals & Plastics Technology Corporation, Danbury, Conn.

[21] Appl. No.: 703,407

[22] Filed: May 21, 1991

[51] Int. Cl.$^5$ ........................ C08F 6/00; C08G 59/00
[52] U.S. Cl. .................................... 528/503; 528/403; 528/408; 528/409; 528/411; 528/416; 528/480; 528/500; 528/502; 522/71; 522/72; 522/74; 522/77; 522/86; 522/149; 522/903; 524/493; 524/495; 524/497
[58] Field of Search ............... 528/403, 408, 409, 411, 528/416, 480, 500, 502, 503; 524/612, 493, 425, 409, 413, 435, 445, 446, 447, 437, 495, 456, 497; 522/71, 72, 74, 77, 86, 149, 903

[56] References Cited

U.S. PATENT DOCUMENTS

| | | | |
|---|---|---|---|
| 3,127,358 | 3/1964 | Hill | 260/2 |
| 3,873,485 | 3/1975 | Fichera | 260/29.2 EP |
| 4,058,124 | 10/1977 | Yen et al. | 128/284 |
| 4,193,892 | 3/1980 | Goeke et al. | 252/428 |

FOREIGN PATENT DOCUMENTS 0142027 10/1980 Japan .

OTHER PUBLICATIONS

Gibson, Matthews, and Samuel, "Computerized Model For Accurate Determination of Ethylene Oxide Diffusion in Sterilized Medical Supplies", Biomaterials, vol. 10, pp. 343-348 (1989).

Matthews, Gibson, and Samuel, "Enhancement of the Kinetics of the Aeration of Ethylene Oxide Sterilized Polymers Using Microwave Radiation", Journal of Biomedical Materials Research, vol. 23, pp. 143-156 (1989).

Alloum, Labiad, and Villemin, "Application of Microwave Heating Techniques for Dry Organic Reactions", Journal Chemical Society, Chemical Communication, pp. 386-387, (1989).

Research Disclosure, 29561, "Rf Heating to Dry Polymers", Nov. 1988.

Article, N. P. Vasilakos and F. Magathaes, "Microwave Drying of Polymers", Journal of Microwave Power, vol. 19(2), 1984.

Computer Print out Search, "Removal of Ethylene Oxide from Polyethylene Oxide Using Microwave Energy", Feb. 26, 1989.

Computer Print Out Search, "Removal of Ethylene Oxide from Polyethylene Oxide Using Microwave Energy", Aug. 16, 1990, Update of Feb. 26, 1989.

Primary Examiner—John Kight, III
Assistant Examiner—Richard Jones
Attorney, Agent, or Firm—W. K. Volles

[57] ABSTRACT

Residual ethylene oxide is removed from poly(ethylene oxide) by the steps of adding to particles of high molecular weight poly(ethylene oxide) a finely divided solid particulate material which is capable of coating the poly(ethylene oxide) particles and impeding their agglomeration under conditions of heating, heating the particles of poly(ethylene oxide) at a temperature of at least 40° C. and preferably which is near their crystalline melting point, and maintaining the temperature for a sufficient time to reduce the ethylene oxide in the particles of poly(ethylene oxide) to ten ppm or less. In one embodiment, the poly(ethylene oxide) is heated by holding the particles in a heated enclosure; in another, it is heated as a slurry in a liquid medium; in yet another, it is heated by warm gas in a gaseously-fluidized bed; and in a fourth, it is heated by microwave radiation.

11 Claims, No Drawings

REMOVAL OF RESIDUAL ETHYLENE OXIDE FROM POLY(ETHYLENE OXIDE)

FIELD OF THE INVENTION

This application relates to removal of low molecular weight organics from polymeric materials, and more particularly, to a process for removal of traces of ethylene oxide from high molecular weight poly(ethylene oxide).

Ethylene oxide (abbreviated EO) is a toxic, gaseous material which is extensively used to sterilize devices which are heat sensitive. It is also a reactive chemical which serves as a precursor for —$CH_2CH_2O$— units in ether-containing polymers. Poly(ethylene oxide) (abbreviated PEO) is such a polymer.

There are two types of poly(ethylene oxide), low molecular weight materials having average molecular weights less than about 9000, which are generally referred to as polyethylene glycols or PEGs and are sold under the CARBOWAX trademark of the Union Carbide Chemicals & Plastics Technology Corporation, and high molecular weight materials having average molecular weights above about 100,000, which are generally referred to as PEOs and are sold under the POLYOX trademark of the Union Carbide Chemicals & Plastics Technology Corporation.

The low molecular weight poly(ethylene oxide) materials typically are liquids or waxes, and present no difficulties with respect to removal of EO remaining from the manufacturing process.

The high molecular weight poly(ethylene oxide) materials are solids having a high degree of crystallinity. As they agglomerate and degrade upon heating, and the molecular weights are sensitive to shearing forces, they thus present serious practical difficulties for removal of residual EO to low levels.

Melting the PEO is generally undesirable because of the degradation problems mentioned above, and because converting a melted mass to the desired powder final form requires cryogenic grinding, which is difficult on a commercial scale and risks contamination and degradation as a result of absorption of water. Furthermore, maintaining the crystallinity substantially the same as that of the originally-formed PEO is important for certain applications, such as use as a swelling agent.

This application is concerned only with removal of EO from high molecular weight PEO. Such high molecular weight PEO has applications in such diverse fields as manufacture of plastic medical devices, food packaging materials, adhesives, flocculants for clays and wood pulp mills, complexing agents for metal cations in batteries, and drug delivery systems.

Because of the toxicity of ethylene oxide and its other effects on biological systems, such as teratogenicity and carcinogenicity, poly(ethylene oxide) which is to be employed for medically related or food uses must contain little or no ethylene oxide.

Typical ethylene oxide polymerization processes for production of high molecular weight poly(ethylene oxide) generally yield product containing approximately 20 to 70 ppm of ethylene oxide. Stripping the poly(ethylene oxide) product under vacuum can reduce the levels of ethylene oxide somewhat, but it has thus far been difficult to obtain poly(ethylene oxide) containing 10 ppm of ethylene oxide or less in a convenient and cost-effective manner. It has been especially difficult to produce poly(ethylene oxide) containing 2 ppm of ethylene oxide or less.

A practical process for achieving low to extremely low levels of residual ethylene oxide is the subject of the present application.

In their work on removal of ethylene oxide from poly(vinyl chloride) articles sterilized by ethylene oxide, Matthews, Gibson, and Samuel found that the rate of diffusion of ethylene oxide from sterilized PVC articles could be accelerated by as much as four-fold relative to conventional heating at a given temperature, by applying microwave radiation at 2.45 GHz. See the Journal of Biomedical Materials Research, 23, 143–156 (1989). Other work by these same authors provided a computerized model for determination of ethylene oxide diffusion from sterilized medical supplies made of poly(vinyl chloride). See the article in Biomaterials, 10, 343–348 (1989). It is to be noted, however, that poly(vinyl chloride) is an amorphous polymer which is heavily plasticized, while poly(ethylene oxide) is highly crystalline. The rate of diffusion of EO through a crystalline polymer lattice is expected to be several orders of magnitude below that for diffusion through an amorphous polymer. These articles, therefore, do not necessarily extrapolate to removal of ethylene oxide from manufactured poly(ethylene oxide).

European Patent Application 283862 by Friedrich, Buttgen, and Herrmann deals with removal of ethylene oxide and/or propylene oxide from surfactants prepared by ethoxylation and/or propoxylation of organic compounds having at least one active hydrogen atom, by treating these surfactants at 70°–130° C. with steam. This treatment is reported to reduce the content of alkylene oxide to 1 ppm or less, thus making the product surfactants suitable for use in pharmaceuticals. A similar steam treatment of high molecular weight poly(ethylene oxide) is not technically feasible because it would produce an extremely viscous product which would not be processable. Degradation of the poly(ethylene oxide) by shearing during such a treatment would also be likely to occur.

Gladkovskii, et al. have reported in Soviet Plastics, 1, 1–3 (1971) an investigation relating to the feasibility of replacing a stripping operation for removal of oxides of ethylene and propylene in the production of polyethers based on these oxides, by holding the product formed in the manufacturing process at a temperature close to the synthesis temperature to achieve lower levels or removal of residual monomer.

The levels of residual monomers in polymers have also been reduced by applying any of a variety of types of radiation, including x-rays, gamma radiation, or electron radiation, or by heating. The particular conditions for removing monomer from polymer depend upon the monomer, the polymer, and the degree to which the monomer is to be removed. Conditions which are effective in one system will not necessarily be applicable to another.

SUMMARY OF THE INVENTION

The present invention provides a process for reducing the ethylene oxide content of poly(ethylene oxide), by the steps of 1. adding to particles of poly(ethylene oxide) having a molecular weight of at least 100,000 a finely divided solid particulate material which is capable of coating the poly(ethylene oxide) particles and impeding their agglomeration under conditions of heating;

2. heating the particles of poly(ethylene oxide) at a temperature of at least 40° C.; and 3. maintaining the temperature for a time sufficient to reduce the ethylene oxide in the particles of poly(ethylene oxide) to ten ppm or less.

DETAILED DESCRIPTION OF THE INVENTION

In the process of the invention a finely divided solid particulate material is first added to the high molecular weight poly(ethylene oxide) particles which are to be treated to reduce their ethylene oxide content. The purpose of the finely divided solid particulate material is to coat the particles of poly(ethylene oxide) and impede their agglomeration under conditions of heating. It is generally employed at a level of approximately 0.5% to 5% by weight based on the poly(ethylene oxide) particles, preferably at a level of about 1% to 3% by weight, and most preferably about 2% by weight. It is generally added to the particles of poly(ethylene oxide) in the dry state, before the poly(ethylene oxide) is heated. However, as will be explained below, this is not true of the liquid slurry embodiment of the invention, in which case the finely divided solid particulate material is added to the slurry containing the poly(ethylene oxide).

The finely divided solid particulate material to be employed in the process of the invention may be an inorganic material such as silica, alumina, titania, talc, a clay mineral, or ground limestone. Organic materials such as flour, graphite, pre-graphitic carbons, powdered sugar, and cotton linters should also serve. The finely divided solid particulate material may be hydrophilic, or may be treated in ways known to the art so as to render it hydrophobic, when such treatments are applicable to the particular material. Thus, for example, hydrophilic and hydrophobic silica are both contemplated as applicable in the process of the invention. Particle sizes are preferably in the 5-50 nm range. Fumed silica, fumed alumina, and fumed titania are preferred, with fumed silica being most preferred.

Poly(ethylene oxide) is a crystalline material having a crystalline melting (softening and sticking) point in the range from about 63° C. to about 65° C. In the process of the invention, the coated particles of poly(ethylene oxide) are generally heated to a temperature in the range from about 58° C. to about 70° C., preferably 60° C. to 67° C., and most preferably in the range of 63° C. to 65° C. An exception is the static heating embodiment of the invention to be discussed below, in which the heating temperature is generally about 40° C. to about 50° C. As shown by the static heating test results, heating at temperatures less than about 58° C. will reduce the ethylene oxide content of the polyethylene oxide, but the process is slowed relative to heating at higher temperatures. On the other hand, heating at temperatures in excess of 70° C. is both unnecessary and in some instances counterproductive, as the particles of polyethylene oxide have a strong tendency to agglomerate at such higher temperatures.

The time of heating is a function of the heating temperature, higher temperatures requiring shorter times. For example, heating at a temperature of about 40° C. typically requires a process time of 2-4 weeks; heating at 60° C. typically requires a process time of from about 15 minutes to about 1 hour or more; while heating at 65° C. requires a heating time of only about 5 minutes, and heating at 70° C. only requires reaching this temperature and then immediately cooling the polymer back down.

Except for the static heating embodiment of the invention, it is generally preferred that the particles of polyethylene oxide being treated are agitated during the heating operation, but this is not absolutely essential. In three of the four examples to be discussed below, the particles of poly(ethylene oxide) were agitated.

Heating of the particles of poly(ethylene oxide) may be accomplished in a variety of ways. In one embodiment of the invention, the poly(ethylene oxide) particles are heated by holding them under static conditions in a heated enclosure. In this embodiment, the PEO is typically held in containers in a heated enclosure such as an oven or a heated room.

In another embodiment of the process of the invention, the particles of poly(ethylene oxide) are heated by applying a stream of heated, non-reacting gas such as nitrogen. This process is conveniently carried out by passing the heated gas through the poly(ethylene oxide) particles in a fluidized bed.

In yet another embodiment of the process of the invention, the particles of poly(ethylene oxide) are heated by contacting them with a heated organic liquid in which they are substantially insoluble, exemplary organic liquids suitable for this purpose being hydrocarbons such as isopentane or n-hexane. In this embodiment, the particles of poly(ethylene oxide) are slurried in the organic liquid and typically heated at a temperature of about 45° C. as the final step in their manufacturing process, to cause the polymerization to proceed as far as possible. Finely divided particulate material such as silica is then added to the slurry at the desired level, and the temperature of the mixture is then raised to the desired treatment temperature, as discussed above. At the end of the treatment time, the mixture is cooled and the product is isolated. Alternatively, poly(ethylene oxide) particles isolated at the end of the manufacturing process can be re-slurried, then treated with finely divided particulate material and heated, as described.

In a fourth embodiment of the process of the invention, the particles of poly(ethylene oxide) are heated by applying microwave radiation. The poly(ethylene oxide) may be conveyed through a microwave field, or microwave radiation may be applied to the poly(ethylene oxide) particles fluidized by a flow of non-reacting gas such as nitrogen. Heating times for the microwave treatment are on the order of minutes as opposed to hours or days for the other embodiments.

The term "microwave radiation" as used herein is defined in Van Nostrand's Scientific Encyclopedia as extending from 1,000 MHz to 300,000 MHz (1-300 GHz). Although many microwave frequencies may be employed in the process of the invention, frequencies between approximately 0.9 and 30 GHz are preferred for practical reasons, primarily because of the availability of microwave generators which can produce these frequencies. Microwave generators operating at 0.914 or 2.45 GHz are commercially available. It is preferred that the microwave treatment be carried out in an inert atmosphere such as nitrogen, as illustrated in the example below. The microwave treatment must be carried out for an effective length of time, this time depending upon the size of the sample being treated, the power level of the microwave source, the efficiency with which the sample is agitated, and perhaps, on the presence of possible plasticizing agents such as water. As demonstrated by the examples to be presented below, microwave heating times as low as a few minutes have been found to be effective for small samples of poly-(ethylene oxide), when a microwave field is applied.

By proper selection of the combination of temperature and time of treatment, residual levels of EO in high molecular weight PEO are conveniently reduced to 10 ppm, 2 ppm, and even 1 ppm or less, as desired.

EXPERIMENTAL

Preparation of Poly(ethylene oxide)

Poly(ethylene oxide) was prepared by polymerization of ethylene oxide using the process and catalyst disclosed in U.S. Pat. Nos. 4,193,892 and 3,127,358 of Union Carbide. Both commercially-prepared and laboratory-prepared materials were used. The poly(ethylene oxide) in each case was high molecular weight PEO having a residual ethylene oxide content typically about 20 ppm.

Method for Ethylene Oxide Analysis

Ethylene oxide (EO) in poly(ethylene oxide) was measured by gas chromatography using head space sampling and the method of standard additions. A sample to be analyzed is placed in a sealed vial, and several otherwise identical samples are spiked with known amounts of EO and similarly sealed. The samples are melted to release residual ethylene oxide, allowed to cool, aliquots of the headspace gas are removed and injected into a gas chromatograph, and the resultant data are used to compute the EO level in the sample by the method of standard additions in the usual way. For routine analyses standard addition analyses were performed using only a single spike of EO rather than multiple spikes. Semiquantitative analyses were performed by dividing the measured EO peak area per gram of sample by the slope of the calibration curve derived from plotting the EO peak area per gram of sample vs. the amount of EO added (micrograms). These semiquantitative analyses were found to agree with the quantitative analyses within 1-2 ppm.

Instrumental parameters:
 column—10 meter×0.53 mm capillary containing Poraplot U (from ChromPack);
 gas flow rates—helium carrier at 15 ml/min., helium make-up gas at 15 ml/min.;
 detector—flame ionization;
 Temperatures—injector, 200 ° C.; detector, 250 ° C.; column, 70 ° C. for 5 minutes, program to 200° C. at 15 ° C. per minute, then hold temperature for 5 minutes to finish.

Viscosity Measurements

Viscosities reported below were measured for 1% solutions in isopropanol/water using a Brookfield viscometer model RVF, spindle 2, and solution temperatures of 25° C.

Example 1 (Static Heating)

Five-gram samples of poly(ethylene oxide) having a molecular weight of about 4 million and hereinafter referred to as material "A" were weighed into 50 ml vials, which were then placed in hot air ovens set at 45° C., 50° C., and 60° C., respectively. One gram samples were similarly weighed into 50 ml vials and placed in a 70° C. oven. At various times measured from the start of heating, vials were removed from the ovens and the EO content of the PEO was determined for 1-gram aliquots of the samples by the semiquantitative gas chromatographic method described above. Results are shown in Table 1 below.

TABLE 1

| Residual EO vs Time in Air Oven | | | |
|---|---|---|---|
| Time (hr) | EO (ppm) | Time (hr) | EO (ppm) |
| 45° C. | | 50° C. | |
| 0 | 22.9 | 0 | 19.7 |
| 4 | 19.8 | 1 | 16.5 |
| 8 | 17.4 | 2 | 14.6 |
| 16 | 17.0 | 4.5 | 13.7 |
| 24 | 14.4 | 22 | 8.6 |
| 40 | 10.9 | 30 | 7.2 |
| 48 | 10.7 | 45 | 5.2 |
| 100 | 5.8 | 94 | 3.1 |
| 60° C. | | 70° C. | |
| 0 | 19.7 | 0 | 19.7 |
| 1 | 14.1 | 0.5 | 13.7 |
| 2 | 11.7 | 1 | 9.0 |
| 4.5 | 10.2 | 2.5 | 0.4 |
| 12 | 6.7 | 4 | 1.7 |
| 22 | 4.9 | 10 | 1.2 |
| 30 | 4.0 | 33 | 0.8 |
| 45 | 3.6 | | |

The data of Table 1 show that heating small samples of PEO causes a relatively fast and approximately exponential decrease in residual EO, with a level of about 10 ppm being achieved in 4.5 hours at 60° C. At 70° C., the EO loss was substantially faster.

Four closed drums of each of two high molecular weight poly(ethylene oxide) materials, having molecular weights of 5 million and 300,000 and hereinafter referred to as materials "B" and "C", respectively, were placed in a circulating air oven set to 55° C., and one drum of each material was periodically removed from the oven and sampled from its center using a "sample thief". The drum containing material B was also provided with a thermometer to permit the temperature at the time of sampling to be determined. It was found that heat transfer to the middle of the drums was slow- for example, the temperature of the center of the drum of material B did not reach 50° C. until the 5-day sample. The other drums are believed to have heated similarly. Each PEO sample was analyzed semiquantitatively as described above, and when the EO level was found to have dropped to below 10 ppm, all the drums were removed from the oven and sampled.

One drum of each material was dumped out at this point in the experiment to visually assess the effect of heated storage on the product. Both materials were found to have undergone compaction and agglomeration. This was manifested in large loosely agglomerated lumps, particularly in the bottom quarter of the drum. Material C, which was lower molecular weight and of a finer particle size than material B, was much more severely agglomerated than material B.

Three drums of each material were then returned to the oven for an additional 93 hours, after which, the EO contents were found to be less than 1 ppm.

The analytical data of EO content vs time are shown in Table 2 below.

TABLE 2

| In-Drum Treatments at 55° C. Oven Temperature Residual EO vs Time | | | |
|---|---|---|---|
| Time (hr) | EO (ppm) | Time (hr) | EO (ppm) |
| 0 | 23.7 | 0 | 15.7 |
| 20 | 20.2 | 26 | 12.6 |
| 44 | 17.0 | 41 | 8.0 |

TABLE 2-continued

| In-Drum Treatments at 55° C. Oven Temperature Residual EO vs Time | | | |
|---|---|---|---|
| Time (hr) | EO (ppm) | Time (hr) | EO (ppm) |
| 53 | 13.8 | 50 | 7.1 |
| 68 | 11.8 | 66 | 6.2 |
| 77 | 11.9 | 93 | 2.1 |
| 93 | 8.5 | 138 | 1.5 |
| 120 | 4.0 | 169 | 0.6 |
| 165 | 2.0 | 186 | 0.9 |
| 196 | 1.0 | | |
| 213 | 0.9 | | |

The results shown in Table 2 indicate that the EO level of drum-stored PEO fell to less than 10 ppm in four days or less upon storage of the drums in a 55° C. environment.

Material B was evaluated for degradation at the conclusion of the above-described static heating test, by measuring the viscosity of a 1% solution in a hydroalcoholic (isopropanol and water) mixture. Results are shown in Table 3 below.

TABLE 3

| Viscosity of Solutions of Material B Treated at 55° C. | | | |
|---|---|---|---|
| Time (hr) | Temp. (°C.) | EO (ppm) | Viscosity (cP) |
| 0 | 10 | 24 | 6990 |
| 93 | 49 | 8.4 | — |
| 120 | 51 | 3.6 | 6925 |
| 196 | >51 | — | 6440 |
| 213 | >51 | <1 | 6200 |

Table 3 data indicates that high molecular weight poly(ethylene oxide) in drum-size containers suffers some degradation upon storage under 55° C. conditions, after approximately five days.

In an attempt to overcome the problem of agglomeration of poly(ethylene oxide) particles upon heating, a second set of drum heating trials were conducted, this time employing PEO coated with 2% by weight of finely divided silica (Cab-O-Sil ® silica flow aid from Cabot Corp.). The samples were a) Material B, 2 drums, one of which contained silica, b) Material D of molecular weight 200,000, containing silica, and c) Material E feedstock, molecular weight 7 million, containing no silica.

These drums were placed in an oven set to 50° C. The drum of feedstock was sampled periodically to determine the temperature of the material and the EO content. The remaining drums were left undisturbed until the end of the experiment, at which time they were sampled. All samples for EO content were again taken from the center of the drum using the "sample thief". A sample from the top of the drum of feedstock was also taken with each EO sampling to determine the loss of viscosity with time. The top was sampled rather than the center since this would represent a worst case due to the faster equilibration of this material to the oven temperature.

Analyses for EO in the several samples of PEO feedstock showed that the rate of EO reduction was substantially the same as that observed at a treatment temperature of 55° C. At the conclusion of the heat treatment period (98 hours) the residual EO in material B was measured at 8.2 ppm, and that in material D was measured at less than 1 ppm. It is noted, however, that the EO level in the sample of material D before treatment was only 4 ppm.

The drums of test material were all removed from the oven after a treatment time of 98 hours, except for one of the two drums of material B. This drum was pulled from the oven at a treatment time of 49 hours, at which time the center of the drum had reached only 40° C. The contents of all drums were sampled upon their removal from the oven, and again at various times after their removal from the oven, until they reached room temperature. Analyses for EO showed that the materials continued to lose EO as they cooled to room temperature.

The drums containing materials B and D which had been treated for 98 hours were dumped to assess agglomeration. Material B without added silica showed agglomeration as had been seen previously. The material D without added silica was quite agglomerated, the bottom 8 to 10 inches of the drum being essentially one large cake. This confirmed the previous observation that agglomeration was more pronounced in lower molecular weight materials. The drums of material B and material D with added silica showed no agglomeration whatsoever, and these materials poured freely.

Data for viscosity versus treatment time are given in Table 4 below. At the end of the treatment time the feedstock material exhibited a viscosity about 85% of that of the material before heat treatment. As this feedstock contained no stabilizer, this constitutes an encouraging result. No decreases in measured viscosity were observed for materials B and D.

TABLE 4

| Viscosity vs. Time of Treatment at 50° C. | |
|---|---|
| Time (hr) | Viscosity (cP) |
| Feedstock (Material E) | |
| 0 | 9260 |
| 60 | 8840 |
| 71 | 8660 |
| 93 | 7900 |
| Material D | |
| 0 | 77 |
| 98 | 80 |
| Material B | |
| 0 | 6480 |
| 98 | 6520 |

A third set of in-drum heating trials was conducted to confirm the beneficial effects of silica addition to the PEO, and to extend the treatment time. Three drums of material D were employed, two of which contained 1.0 and 0.5% by weight of added silica, respectively. The third drum contained no added silica. These drums of material D were employed to confirm the effect of silica addition on agglomeration of the PEO. Finally, a drum of material B was also treated, to serve as a monitor for EO loss during the treatment.

The drums of these materials were placed in a 50° C. oven and left undisturbed for 4 days. The internal temperature of one drum was monitored using a thermocouple placed in the center of the drum. After 4 days, the drum of material B was sampled to verify that its EO level was below 10 ppm. All of the sample drums were then left in the oven undisturbed for an additional 80 hours, at which point they were removed. The total treatment time in the oven was 176 hours.

It was seen that the material D which contained 0.5% by weight of added silica contained no agglomerated material, and was free flowing. Samples of material B were analyzed for residual EO and for viscosity, and the results of these tests are shown in Table 5 below.

TABLE 5

MATERIAL B TREATED IN 50° C. OVEN

| Time (hr) | Temp. (°C.) | EO (ppm) | Viscosity (cP) |
|---|---|---|---|
| 0 | 25 | 19 | 6980 |
| 95 | 50 | 8.2 | — |
| 240* | 34 | 1.4 | 6300 |

*This point represents 176 hours in 50° C. oven followed by 64 hours cooling at room temperature.

These data show that treatment under the test conditions reduced the residual EO level from 19 ppm to 8 ppm over a 4-day period, and that employing a heating time of 176 hours followed by a cooling time of 64 hours produced material containing 1.4 ppm of residual EO. The viscosity results indicate that a small amount of degradation occurred in this test, similar to the result observed in the earlier drum heating treatments.

The above static heating tests show that heating poly(ethylene oxide) at 50° C. or 55° C. for a period of about 4 days is effective to reduce the material's residual ethylene oxide content to less than 10 ppm. Addition of 0.5 or 1.0% by weight of finally divided silica effectively prevents agglomeration during such heat treatments. Treatment times of approximately 4 days do not cause appreciable degradation. Treatment times substantially in excess of 4 days cause small amounts of degradation while further reducing the residual EO of the materials.

Example 2 (Gas Purging of Liquid Slurry)

A number of experiments were conducted on poly(ethylene oxide) (PEO) slurries obtained at the end of the ethylene oxide polymerization as discussed above, and before termination of the reaction, to determine whether various treatments could reduce the ethylene oxide content of the poly(ethylene oxide) product to the desired levels. Combinations of isopropanol, fumed silica, wet or dry $N_2$ or $CO_2$, temperatures, and times were tried to rid the polymer of ethylene oxide.

For the cases in which isopropanol and silica were used, a solution of 20 g of isopropanol in 100 ml of hexane was added to the 45° C. reaction mixture slowly over about 15 minutes, heating was continued for approximately 15 minutes, then 11 g of fumed silica were added. The temperature was next increased to about 65°±1° C., with good agitation. At this point, in those experiments employing gas, water-saturated nitrogen or $CO_2$, or in one case dry $N_2$, (50 or 800 ml/minute at 25°/~800 mm pressure) was purged through the slurry in the absence of the dry ice condenser for about 1 hour, after which the mixture was cooled to room temperature.

After the various treatments, the product poly(ethylene oxide) materials were isolated and dried overnight at room temperature under house vacuum, to a constant weight, then analyzed for ethylene oxide. It was noted that in the runs which employed silica addition and heating to about 65° C., the PEO particles did not agglomerate significantly, and the sparging could be carried out readily for an hour or more while maintaining a stirrable slurry. The results of these experiments are summarized in Table 6 below.

TABLE 6

| | EO Removal by Gas Sparging (550 g PEO in 2 l of hexanes) | | | | | | | | | |
|---|---|---|---|---|---|---|---|---|---|---|
| Run No. | 1 | 2 | 3 | 4 | 5 | 6 | 7 | 8 | 9 | 10[4] |
| Procedure | | | | | | | | | | |
| +20 ml isopropanol/ 100 ml hexanes | No | No | No | No | No | Yes | Yes | Yes | No | Yes |
| +11 g $SiO_2$ | No | No | Yes[1] | Yes[1] | Yes[2] | Yes[2] | Yes[1] | Yes[1] | Yes[1] | Yes |
| +Wet Gas ($N_2/CO_2$) | $N_2$ | $CO_2$ | $N_2$ | $N_2$ | $N_2$ | $N_2$ | Dry $N_2$ | None | None | $N_2$ |
| Pot Temp. (°C.) | 25 | 35 | 65 | 65 | 65 | 65 | 65 | 65 | 65 | 65 |
| Time (min.) | 30 | 30 | 60 | 60 | 60 | 30 | 60 | 60 | 60 | 60 |
| Rate (ml/min.) | 800 | 800 | 800 | 800 | 800 | 50 | 50 | 0 | 0 | 50 |
| Ethylene Oxide in PEO (EO in ppm) | 34 | 24 | <1 | <1 | 2, .82, .88[3] | 2.1 | 2.3 | 2.3 | 3.6 | <1 |

Footnotes for Table 6:
[1] Degussa Aerosil ®-380 hydrophilic silica. ~300 m$^2$/g. —OH surface.

[2] Degussa Aerosil ® R-974 hydrophobic silica. ~170 m$^2$/g. 30% —OH, 70% $(CH_3)_2Si\begin{smallmatrix}O-\\ \\O-\end{smallmatrix}$ on surface.

[3] Measured by spiking method.
[4] Commercial poly(ethylene oxide) containing 21 ppm EO was used.

The results shown in Table 6 demonstrate that: temperatures below approximately 65° C. are less effective in removing EO than temperatures of approximately 65° C. (see runs 1 and 2); purging with dry $N_2$ or using no gas purge is less effective than purging with wet gas (see runs 7, 8, and 9); and purging at low gas flow rates is at least as effective as using high gas flow rates, provided that the treatment is carried on long enough (see runs 3-6, and 10). From these data, it was concluded that a very suitable process for removing EO from PEO is to add fumed silica to a slurry of PEO at a level of about 1-3% by weight of the PEO to be treated, raise the slurry temperature to the vicinity of the softening point of the PEO, namely about 65° C., and purge the system with a gas such as nitrogen.

Example 3 (Treatment with Microwave Radiation)

Samples of poly(ethylene oxide) were treated with hydrophilic fumed silica at a level of about 2% by weight, and placed in a 30-ml sintered glass (medium frit) filter funnel connected to a heavy-walled filter flask via a rubber stopper. This flask was in turn connected to a source of nitrogen gas, so that the PEO could be fluidized upon passing nitrogen upwardly through it. This apparatus was placed in the chamber of a 700 watt Sharp ® microwave home cooker (Sears Model No. 89129), with the PEO in the filter funnel centered in the microwave field. Most of the microwave field was external to the PEO. The nitrogen gas was brought into the cooker through existing slots both in the external and the internal shields.

The samples were fluidized by a flow of approximately 860 ml/min. (except as otherwise indicated) of nitrogen gas and subjected to a 0.914 GHz microwave field generated by a maximum of 650 watts of electrical power, for variable times of exposure and variable applied power time cycles, and were then analyzed for residual ethylene oxide. The results of these experiments are summarized in Table 7 below.

TABLE 7

Microwave Treatment of PEO; Conditions and Results[1]

| Run No. | Total Power Input (watts)[2] | Total Time Power On (min) | Power Time Cycle (min) On | Power Time Cycle (min) Off | Product Est. % PEO Fused | EO Conc.[3] (ppm) | Remarks |
|---|---|---|---|---|---|---|---|
| 1 | 54.2 | 5.0 | 5 | 0 | 100 | 0 | N$_2$ 440 ml/min |
| 2 | 54.2 | 5.0 | 5 | 0 | 100 | 0 | |
| 3 | 54.2 | 5.0 | 5 | 0 | 100 | <1 | Wet N$_2$. 440 ml/min |
| 4 | 54.2 | 5.0 | 5 | 0 | 100 | <1 | Wet N$_2$, 440 ml/min |
| 5 | 54.2 | 5.0 | 1 | 1 | 100 | 0 | |
| 6 | 43.3 | 4.0 | 1 | 1 | 100 | 0 | |
| 7 | 32.5 | 3.0 | 1 | 1 | 85 | 2.4 | |
| 8 | 21.7 | 2.0 | 1 | 1 | 35 | 13 | |
| 9 | 32.5 | 3.0 | 1 | 2 | 15 | 15 | |
| 10 | 32.5 | 3.0 | 1 | 3 | 85 | 3 | |
| 11 | 32.5 | 3.0 | 1 | 1 | 100 | <1 | 6.0 g PEO |
| 12 | 43.3 | 4.0 | 1 | 1 | 100 | 0 | |
| 13 | 32.5 | 3.0 | 1 | 1 | 100 | <1 | |
| 14 | 21.7 | 2.0 | 1 | 1 | 100 | <1 | |
| 15 | 21.7 | 2.0 | .5 | 1 | 95 | 1 | |
| 16 | 21.7 | 2.0 | .5 | 2 | 80 | 2.7 | |
| 17 | 43.3 | 4.0 | 1 | 1 | 100 | 0 | |
| 18 | 21.7 | 2.0 | 1 | 1 | 95 | <1 | |
| 19 | 21.7 | 2.0 | 1 | 1 | 5 | 15 | |
| 20 | 21.7 | 2.0 | .5 | 1 | 0 | 17 | |
| 21 | 21.7 | 2.5 | .5 | 1 | 0 | 14 | |
| 22 | 32.5 | 3.0 | .5 | 1 | 95 | 2 | |
| 23 | 32.5 | 3.0 | .5 | 1.5 | 10 | 13 | |
| 24 | 21.7 | 2.0 | 1 | 1.5 | 0 | 18 | |
| 25 | 32.5 | 3.0 | .5 | 2 | 90 | 11 | |

Footnotes for Table 7:
[1] 3 g PEO + 2% Aerosil ®-380
[2] Applied power calculated: $\frac{650 \text{ watts} \times \text{time power applied (min.)}}{60 \text{ minutes}}$
[3] EO in feedstock was 19 ppm.

The results shown in Table 7 demonstrate that heating the PEO to fusion (63° C.–65° C.) reduces residual EO to very low levels in a matter of minutes, but that heating at lower temperatures which do not produce substantially complete fusion does not result in such efficient reductions of EO. As used in this application, the term fusion means that the particles of PEO stuck together, not that they melted and formed a solid mass. The fused particles could be separated by crumbling the material by hand, or by regrinding.

The total time of treatment, cycling of microwave power, nitrogen flow, use of wet or dry gas, and sample size did not seem to affect the results.

Example 4 (Treatment With Warm Nitrogen Without Microwave)

Several trials were run in the same manner as Example 3 above, except that the samples were heated by applying warm nitrogen in the fluidizing operation. Microwave radiation was not employed. Results are shown in Table 8 below.

TABLE 8

EO Removal from PEO with Hot Nitrogen (No Microwaves)[1]

| Run No. | 1 | 2 | 3 | 4 |
|---|---|---|---|---|
| Avg. N$_2$ Temp. (°C.) | 59 | 61 | 63 | 65 |
| Time at Avg. Temp. (min) | 15 | 15 | 18 | 15 |
| PEO Fused (est. %) | 14 | 55 | 73 | 100 |
| EO in PEO (ppm) | 12 | 6 | 3 | <1 |

Footnote for Table 8:
[1] Starting material EO level was 19 ppm.

As in Example 3, it is seen that as the amount of fusion increases, the level of residual EO decreases. However, the times required are longer than when microwave radiation is employed for the heating operation.

Other embodiments of the invention will be apparent to those skilled in the art from a consideration of this specification or practice of the invention as disclosed herein. It is intended that the specification and examples be considered as illustrative, with the true scope and spirit of the invention being limited only by the following claims.

We claim:

1. A process for reducing the ethylene oxide content of high molecular weight polyethylene oxide, consisting essentially of:

(1) adding to particles of poly(ethylene oxide) having a molecular weight of from about 100,000 to 7 million and which contain from about 20 to 70 ppm of ethylene oxide a finely divided solid particular material which is capable of coating said poly(ethylene oxide) particles and impeding their agglomeration under conditions of heating, said addition being conducted in a dry state; and (2) removing ethylene oxide by agitating and and heating said particles of poly(ethylene oxide) in said dry state at a temperature of from about 40° C. to about 70° C. for a time sufficient to reduce the ethylene oxide level in said particles of poly(ethylene oxide) to ten ppm or less.

2. The process of claim 1 wherein said finely divided solid particular material is selected from the group consisting of silica, alumina, titania, talc, clay minerals, and ground limestone.

3. The process of claim 1 wherein said finely divided solid particulate material is selected from the group consisting of flour, graphite, pre-graphitic carbons, powdered sugar, and cotton linters.

4. The process of claim 1, wherein said particles of poly(ethylene oxide) are heated at a temperature of at least about 50° C.

5. The process of claim 1 wherein said particles of poly(ethylene oxide) are heated to a temperature in the range from about 58° C. to about 70° C.

6. The process of claim 1 wherein said heating step is accomplished by holding said particles of poly(ethylene oxide) in a heated enclosure.

7. The process of claim 1 wherein said heating step is accomplished by applying a stream of heated non-reacting gas to said particles of poly(ethylene oxide).

8. The process of claim 1 wherein said heating step is carried out by applying microwave radiation to said particles of poly(ethylene oxide).

9. The process of claim 1 wherein the level of residual ethylene oxide in the poly(ethylene oxide) is 2 ppm or less.

10. The process of claim 1 wherein the poly(ethylene oxide) has a molecular weight of from about 300,000 to 5 million.

11. A process for reducing the ethylene content of high molecular weight poly(ethylene oxide), consisting essentially of;

adding to particles of poly(ethylene oxide) having a molecular weight of from about 100,000 to 7 million and which contain from about 20 to 70 ppm of ethylene oxide a finely divided silica which is capable of coating said poly(ethylene oxide) particles and impeding their agglomeration under conditions of heating, said addition being conducted in a dry state;

heating said particles of poly(ethylene oxide) in said dry state at a temperature of from about 40° C. to about 70° C. and agitating said particles during said heating; and maintaining said temperature for a time sufficient to reduce the ethylene oxide level in said particles of poly(ethylene oxide) to ten ppm or less.

* * * * *

UNITED STATES PATENT AND TRADEMARK OFFICE
CERTIFICATE OF CORRECTION

PATENT NO.   : 5,216,122
DATED        : June 1, 1993
INVENTOR(S)  : Walter T. Reichle, et al.

It is certified that error appears in the above-identified patent and that said Letters Patent is hereby corrected as shown below:

Column 12, line 63, delete "and", second occurrence.

Signed and Sealed this

Twenty-second Day of February, 1994

Attest:

BRUCE LEHMAN

*Attesting Officer*   *Commissioner of Patents and Trademarks*